United States Patent [19]

Viebrantz et al.

[11] Patent Number: 4,768,230
[45] Date of Patent: Aug. 30, 1988

[54] HOUSING FOR A HAND-HELD REMOTE CONTROL TRANSMITTER

[75] Inventors: Hans-Joachim Viebrantz, Bad Neustadt/Salle; Alfred Vogt, Salz, both of Fed. Rep. of Germany

[73] Assignee: Preh Elektrofeinmechanische Werke Jakob Preh Nachf. GmbH & Co., Bad Neustadt/Saale, Fed. Rep. of Germany

[21] Appl. No.: 849,711

[22] Filed: Apr. 9, 1986

[30] Foreign Application Priority Data

Apr. 17, 1985 [DE] Fed. Rep. of Germany ....... 3513817

[51] Int. Cl.⁴ .............................................. H04B 9/00
[52] U.S. Cl. .................. 455/603; 200/302.2; 340/365.5; 361/399; 455/128
[58] Field of Search ................... 455/89, 90, 128, 352, 455/603; 340/365 S, 696; 358/194.1; 361/399, 412; 200/302.2, 5 A, 5 E

[56] References Cited

U.S. PATENT DOCUMENTS

| | | | |
|---|---|---|---|
| 3,676,607 | 7/1972 | Nash et al. | 200/5 A |
| 3,959,610 | 5/1976 | Finnegan et al. | 455/90 |
| 4,176,315 | 11/1979 | Sunnar Borg | 361/399 |
| 4,225,970 | 9/1980 | Jaramillo et al. | 455/90 |
| 4,491,970 | 1/1985 | La White et al. | 455/100 |
| 4,540,865 | 9/1985 | Calder | 200/5 A |
| 4,621,373 | 11/1986 | Hodsdon | 455/128 |

FOREIGN PATENT DOCUMENTS 7415872  8/1974 Fed. Rep. of Germany .
2368096 10/1976 France ................................. 455/603

OTHER PUBLICATIONS

Melcher et al., Infra-Red Remote Control–Components Report XIII (1978), Nov., #5, pp. 144–149.

Primary Examiner—Robert L. Griffin
Assistant Examiner—Leslie Van Beek
Attorney, Agent, or Firm—Woodcock Washburn Kurtz Mackiewicz & Norris

[57] ABSTRACT

A housing for a hand-held remote control transmitter including a battery, electronic transmission circuit, and a transmission device, including a housing frame having at least one opening for receiving a battery or otherwise accessing the interior of the housing and a cutout for receiving a touch keypad wherein a sealing rim is provided extending into the housing frame surrounding the cutout and an elastic contact mat is compressed against the rim sealing the cutout opening. A cover part is provided for covering the opening and a gasket surrounding the periphery of the opening and of the cover part is compressed between the cover part and the housing frame. Each other opening providing the housing frame is also sealed thereby protecting the contents of housing from liquids and other environmental factors.

16 Claims, 7 Drawing Sheets

HOUSING FOR A HAND-HELD REMOTE CONTROL TRANSMITTER

FIELD OF THE INVENTION

The invention pertains to a housing for a hand-held transmitter for remote control, in which a battery, an electronic transmission circuit and a transmission device, are housed, which has removable cover parts at the openings of the housing, and in which a cut-out is present into which a keypad, having an elastic contact mat extending over the entire keypad, is set, and, in particular, to such a housing which is sealed against environmental influences.

BACKGROUND

Hand-held remote control transmitters are common for electronic entertainment devices. Hand-held transmitters of this type are also known for the control of functions in many other fields.

Normal housings for such transmitters have hardly any sealing. Environmental influences can therefore exert detrimental effects.

SUMMARY OF THE INVENTION

An object of the invention is to provide a housing of the type referred to above which is sealed against environmental influences, particularly against the penetration of moisture, and in which on the other hand, the cover part or parts can be repeatedly replaced in a sealed manner and to the transmitters device including these features.

According to the invention, the above object and others are fulfilled by providing a housing of the type referred to above having a housing frame with at least one opening and a cover part for sealingly covering the opening. Sealing is provided by means of a gasket positioned in a groove-like depression around the periphery of the opening either on the frame or the cover part. The gasket is compressed between the cover part and the housing. A surrounding sealing rim projecting inward into the housing is also formed on the periphery of a cutout provided for exposing a keypad and an elastic contact mat is provided compressed against the sealing rim over its entire periphery thereby sealing that opening.

The annular seal ensures that each particular cover part is securely sealed against the housing. The cover parts can even be removed without reducing the sealing effect when they are subsequently replaced. For example, at least one cover part will need to be removable so that the battery can be replaced. Another removable cover part can be provided to adjust the coding of the transmission circuit.

Due to the fact that the contact mat is compressed against the sealing rim, the contact mat itself is utilized for sealing purposes. This therefore eliminates the needs for an additional O-ring or like gasket.

In a preferred embodiment of the invention, an infrared-transparent disc is placed in the housing in front of the transmission component and is welded around its circumference to the housing. This produces a further improvement in sealing. If the housing itself consists of a plastic which is transparent to infrared, this sealing procedure is then superfluous.

By means of the invention, the interior of the housing is protected against environmental effects. For example, no damage would occur if beverages were spilled on the housing, if the hand-held transmitter fell into water, was left in the rain or made its way into a sauna or bath. Tropical climates or industrial environments would likewise have no detrimental effect. The housing can even be washed off or disinfected. This significantly expands the area of applicability of such hand-held transmitters.

In the embodiment of the invention, the keypad extends at an angle to the top side of the housing which is placed above it, so that fluids poured onto the keypad will run off.

Other advantageous embodiments of the invention may be gathered from the subsidiary claims and the following description of one example of an embodiment.

DETAILED DESCRIPTION OF THE INVENTION

Figure 1:
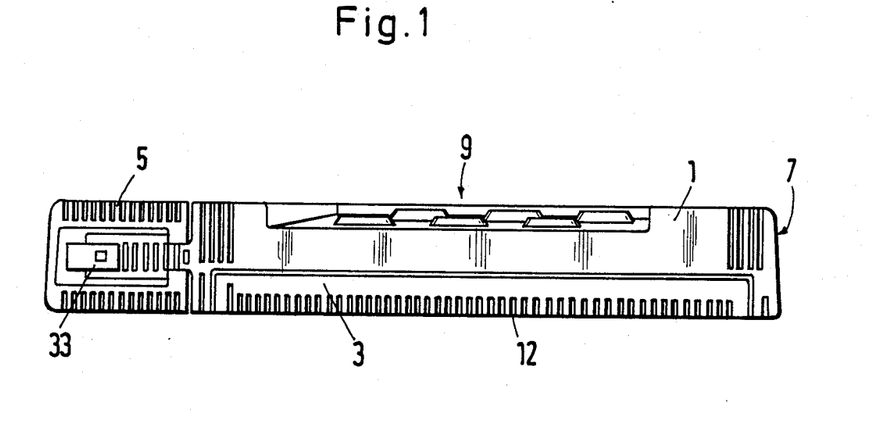
FIG. 1: a side view of the housing of a hand-held transmitter.
Figure 2:
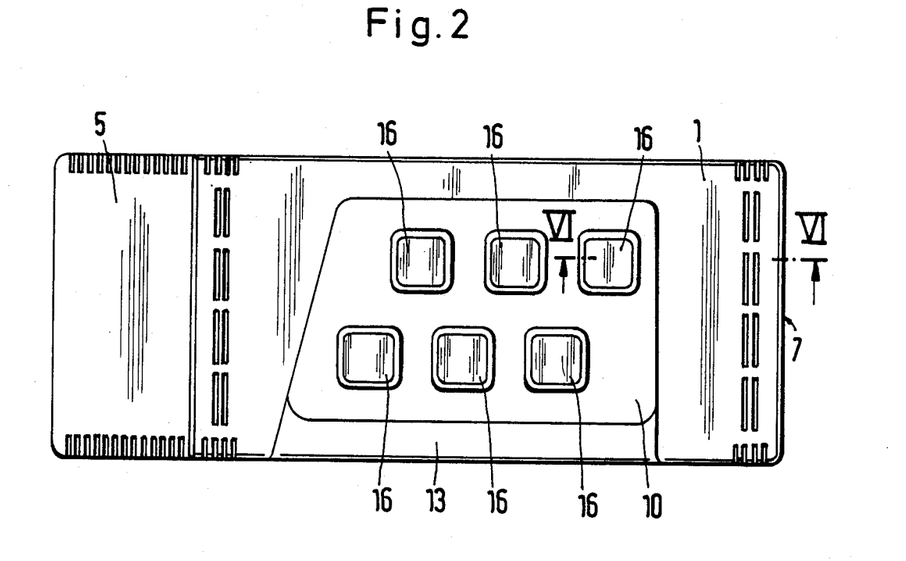
FIG. 2: a perspective view of the housing.
Figure 6:
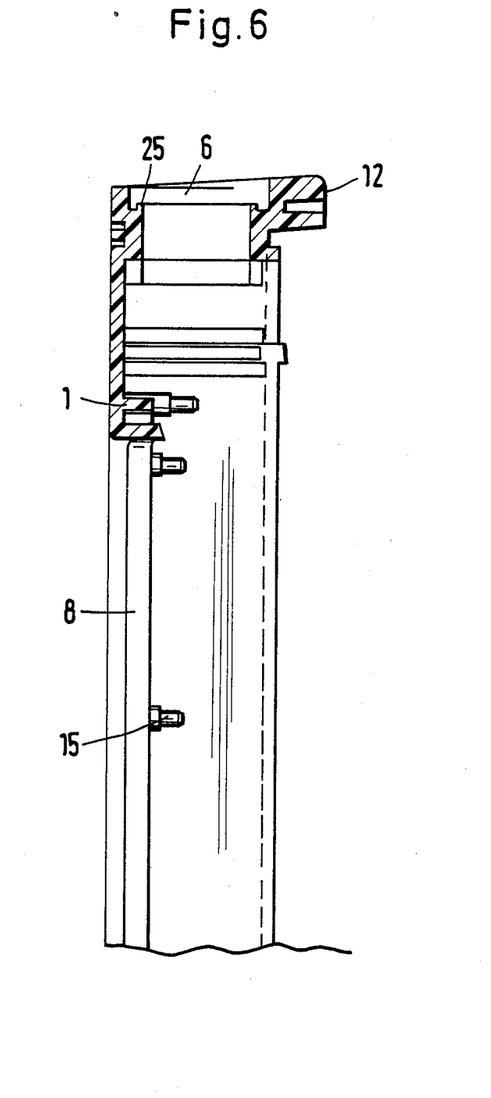
FIG. 6: a partial cross section along line VI—VI in FIG. 2 showing the frame of the housing.

A plastic housing for a hand-held remote control transmitter has a basic frame 1. This has an opening 2 (cf. FIG. 4) on the bottom, which is closed off with a removable bottom cover part 3. The frame 1 has an opening 4 on the rear side (cf. FIG. 3), over which a battery case cover part 5 is placed. On the front side of the frame 1 is an opening 6 (cf. FIG. 6), into which an infrared-transparent disk 7 is placed. The disk is not illustrated in FIG. 6 but is indicated in FIGS. 1 and 2.

Figure 3:
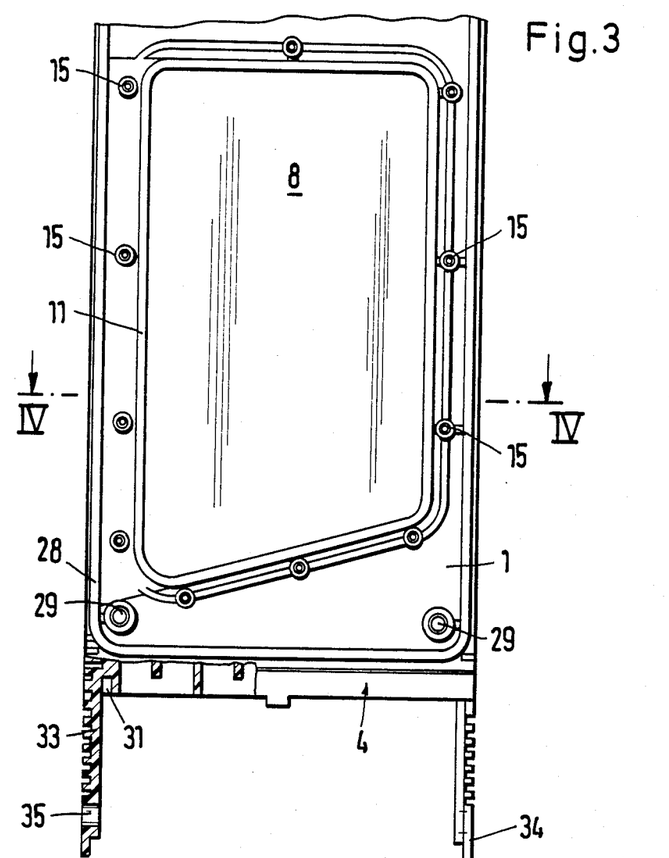
FIG. 3: a partial internal view of the basic frame of the housing without the contact mat and the battery case cover part along the line III—III in FIG. 4.
Figure 4:
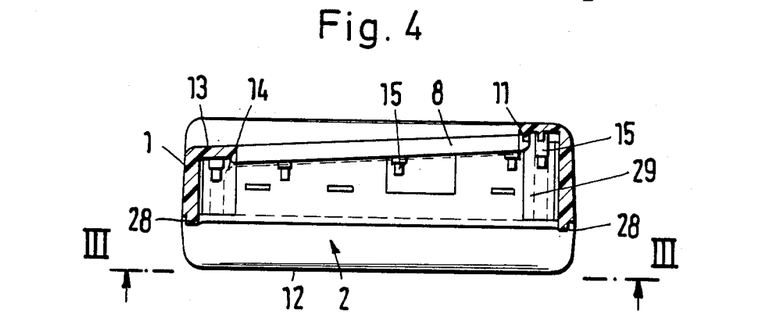
FIG. 4: a cross section along line IV—IV in FIG. 3.

The frame 1 is equipped, opposite the bottom opening (cf. FIG. 4) and with a cutout 8 (cf. FIGS. 3 and 4). Into this is placed a keypad 9, which has an elastic contact mat 10 (cf. 1 and 2). This extends continuously over the entire cutout 8.

A sealing rim 11 projecting into the interior of the housing frame 1 runs around the entire periphery of the cutout 8 (cf. FIG. 4). This rim extends in a plane that is not parallel to the bottom surface 12 of the housing, but rather runs obliquely with respect to it (cf. FIGS. 1 and 4). The frame 1 extends at a corresponding oblique angle in the rim area 13 adjacent to the deepest side of the cutout 8. Liquids poured on the keypad 9 can thus flow laterally off the latter over the rim area 13.

Figure 5:
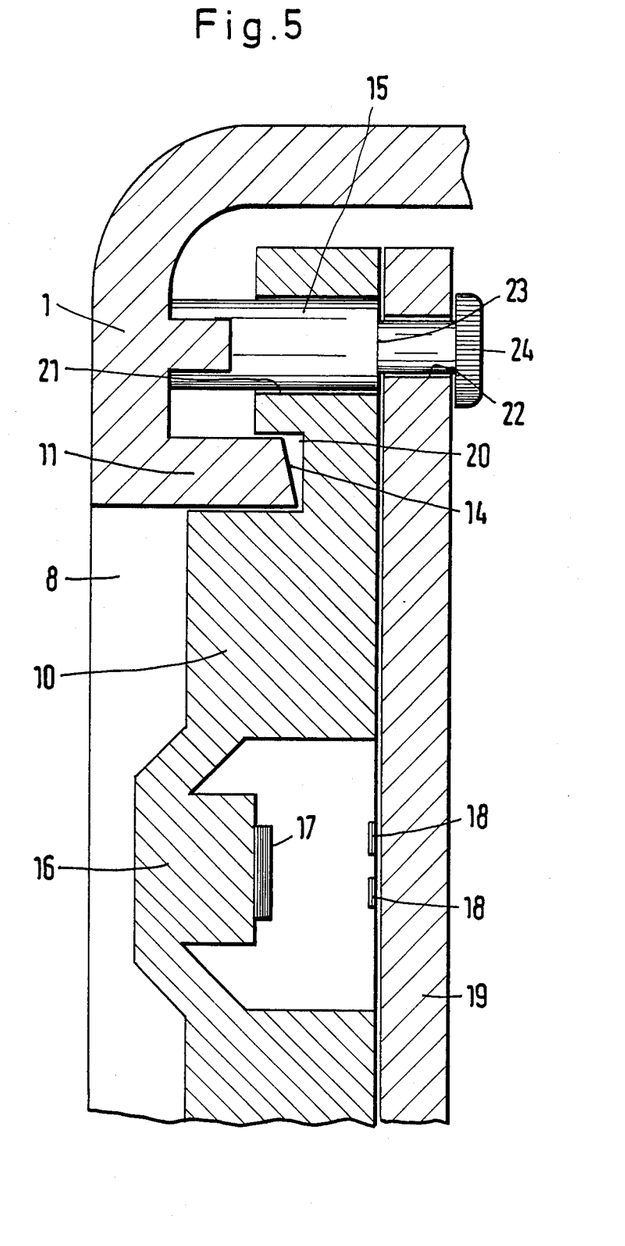
FIG. 5: an enlarged partial view of the sealing area between the housing frame and the contact mat.

The sealing rim 11 has a sealing surface 14 which rises obliquely from the cutout 8 on the interior of the frame 1 (cf. FIGS. 4 and 5). In addition to the sealing rim 11, several welding lugs 15 are distributed over the frame 1 (cf. FIGS. 3-5).

The contact mat 10 consists, for example, of silicon rubber. An electrically conductive contact part 17 is attached at each key point 16 and lies opposite a pair of strip conductors 18 on a circuit board 19 on which the contact mat 10 lies (cf. FIG. 5).

At the sealing rim 11, the contact mat 10 has a groove 20. The sealing surface 14 of rim 11 is oblique with respect to the bottom of the groove 20 (cf. FIG. 5), and to the opposing bottom major planar surface 12. The contact mat 10 and the circuit board 19 have perforations 21 and 22, respectively, through which the welding lugs 15 project. The welding lugs 15 have a shoulder 23. The dimensions are such that when the circuit board 19 is in contact with the shoulder 23, at least part of the mat 10 in the region of the groove 20 is compressed under surface 14. Since the sealing surface 14 is at an angle with respect to the bottom of the groove 20, the contact mat 10 is forced outwards when compressed and therefore does not buckle. After the circuit board 19 has been pressed against the shoulder 23, the ends of the welding lugs 15 are welded onto retainer knobs 24. The contact mat 10 is thus set into the cutout 8 in a permanently sealed in a crease-free manner.

The circuit board 19 acts as a stiffener for the contact mat 10, so that the latter is sealed against the sealing surface 14 even in areas between the welding lugs 15. In another embodiment of the invention, the contact mat 10 can also be stiffened by being injection-molded around a metal carrier which leaves the key points 16 free. The contact mat 10 can then be attached to the welding lugs 15 independently of the circuit board 19. Screw-type fasteners can also be provided for the contact mat 10 instead of the welding lugs.

The opening 6 in the frame 1 as configured, at the point where the disc 7 is set in, as a collar 25 that is wedge-shaped in cross-section (cf. FIG. 6), to which the disk 7 can be tightly welded.

Figure 7:
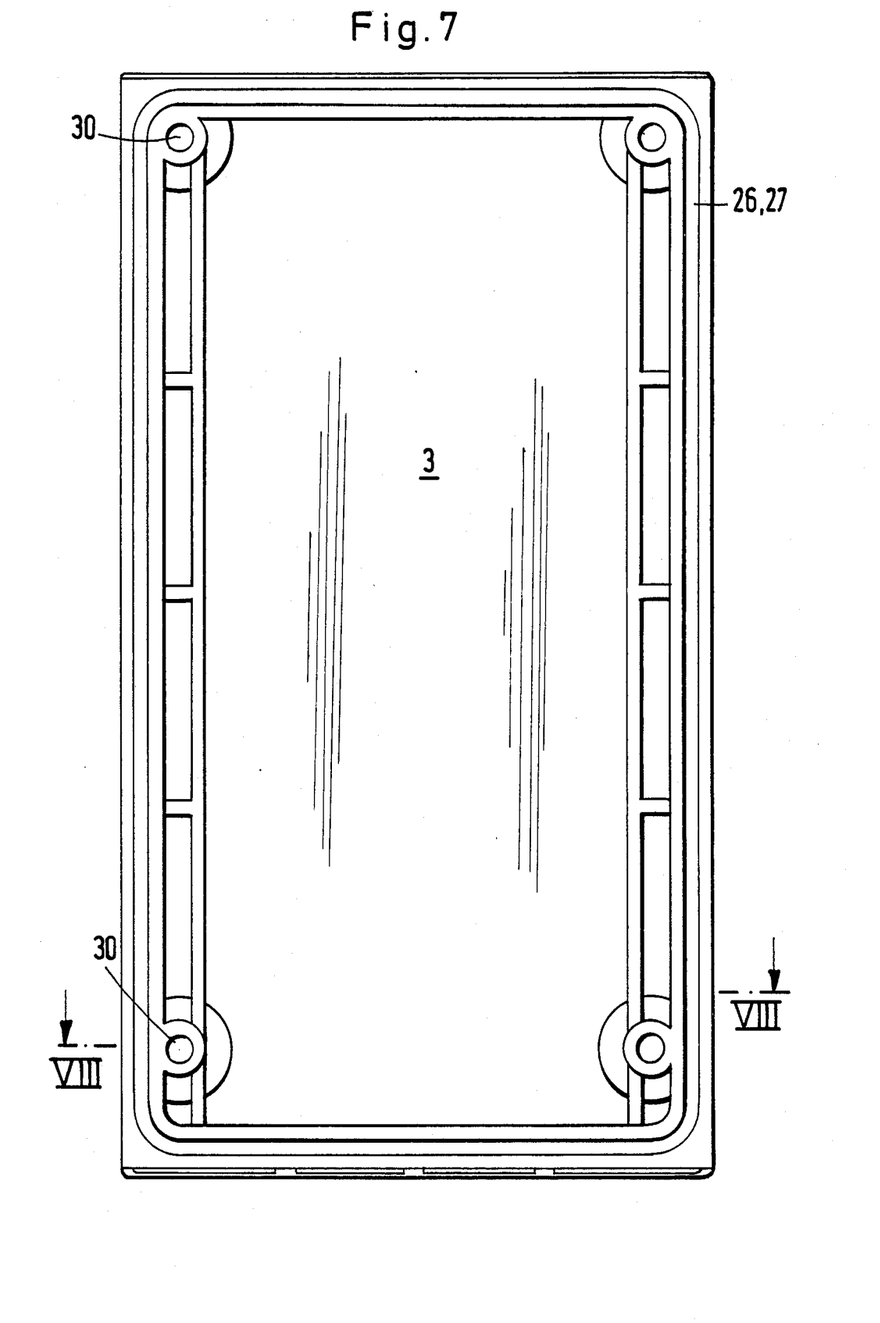
FIG. 7: an internal view of the bottom cover part of the housing.
Figure 8:
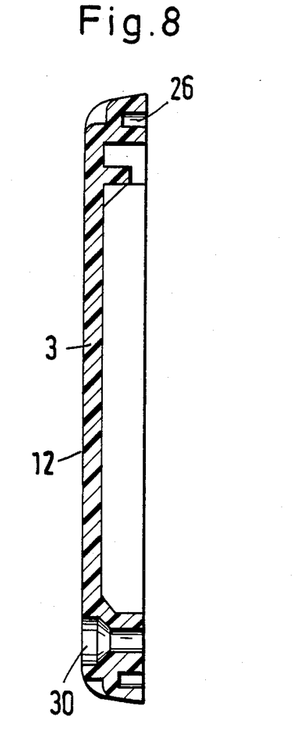
FIG. 8: a cross section along line VIII—VIII in FIG. 7.

The bottom cover part 3 has a peripheral groove 26 (cf. FIG. 8) in which an O-ring 27, made, for example, of silicon rubber, is placed (cf. FIG. 7) such that the top of O-ring 27 and the portion of the cover 3 around the groove 26 extend in one flat plane. Matching the O-ring 27 and groove 26 is a sealing rim 28 on the frame 1 (cf. FIG. 4) which surrounds the bottom opening 2 in said frame 1. To attach the bottom cover part 3 to the frame 1, the frame 1 has threaded stems 29 (cf. FIGS. 3 and 4), and the cover part 3 has through holes 30 (cf. FIG. 7) for matching bolts. When the bolts are tightened, the O-ring is pressed firmly against the sealing rim 28, so that the bottom cover part 3 is sealed against the frame 1.

If necessary, the bolts can be sealed from the outside with sealing varnish. In the embodiment example illustrated, the bolt attachment points 29, 30 are located inside the seal formed by elements 26, 27 28. It is also possible to place the bolt attachment points outside the seal.

Figure 9:
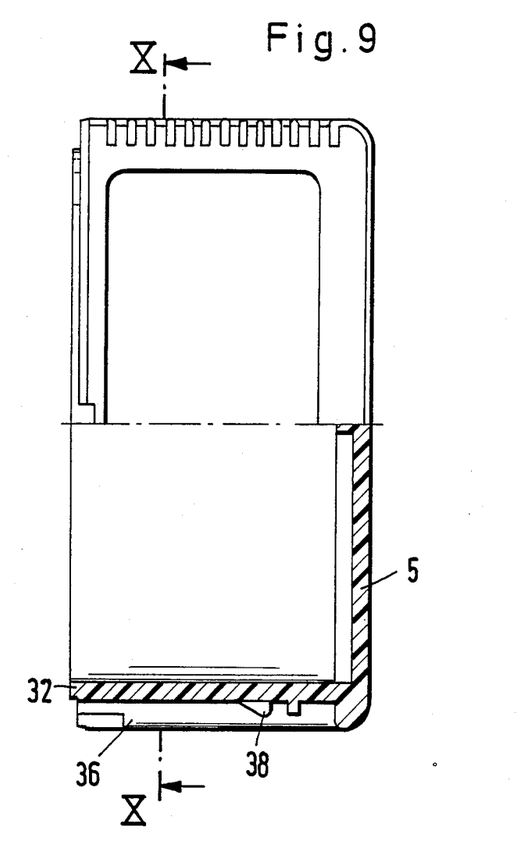
FIG. 9: a partial sectional view of the battery case cover part of the housing, enlarged as compared with FIGS. 1 and 2.
Figure 10:
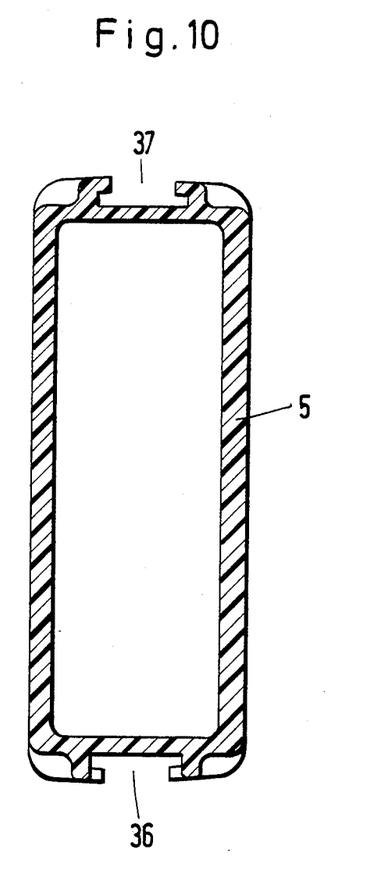
FIG. 10: a cross section along line X—X in FIG. 9.

The frame 1 has a groove 31 which circumscribes a rear-side opening 4 (cf. FIG. 3). Placed in the groove 31 is an O-ring (not shown for clarity), which can also be made, for example, of silicon rubber and also lies in a single plane with a portion of the frame 1 surrounding the groove 31. Associated with the groove 31 and the O-ring placed therein is a flat sealing rim 32 on the battery case cover part 5 (cf. FIGS. 3 and 9). Outside the groove 31, the frame 1 bears two elongated tabs 33 and 34, which have snap-fit openings 35. The battery case cover part 5 has guides 36 and 37 for the tabs 33 and 34 (cf. FIG. 10). At the base of each of the guides 36 and 37 is a snap tab 38, matching the snap-fit opening 35. When the guides 36 and 37 of the battery case cover part 5 are slid onto the tabs 33 and 34 on the frame 1, the snap tabs 38 snap into the openings 35, pressing the sealing rim 32 firmly against the O-ring in the groove 31. This creates the desired seal. The battery case cover part 5 can easily be removed to replace batteries. If it is re-installed, the original sealing effect is again produced.

In the embodiment example, a bolt-on attachment is shown for one cover part and a snap attachment for the other cover part. Both attachment methods cause the O-rings to seal by compression. It is also possible to provide snap attachment or bolt-on attachment for both cover parts. In the embodiment example described, one O-ring lies in a groove in one cover part, and the other O-ring is located in a groove in the frame 1. It is also possible for both O-rings to be placed in the cover parts or in the frame 1.

It has been demonstrated that the housing described in water-tight up to a pressure of $10^4$ pascals with a service life of more than 250,000 actuations per contact.

We claim:

1. In a housing for a hand-held remote control transmitter, of the type including a frame in which a battery, and an electronic transmission circuit and a transmission component, particularly an infra-red transmission component are housed, said frame having a removable cover part disposed on an opening of the frame, said frame also including a cutout portion for receiving a touch keypad, the improvment comprising: gasket means placed and compressed between said cover part and the housing frame in a surrounding groove-like depression running around said frame for forming a water-tight seal therebetween, a surrounding sealing rim on said frame projecting inward into the housing frame on the periphery of the cutout portion and an elastic contact mat compressed against the sealing rim over the entire periphery of the sealing rim, an infra-red transparent disk placed on the housing frame in front of the transmission component covering a transmission opening in the frame and welded to the housing frame sealing said opening, and a peripheral collar, wedge-shaped in section, provided on the housing frame around the transmission opening, supporting and welded to said disk.

2. The housing according to claim 1 comprising the keypad extending obliquely with respect to a bottom surface of the housing frame opposite it.

3. The housing according to claim 2, wherein an outer surface of the housing frame is disposed to form an oblique angle with said cutout portion.

4. The housing according to claim 1 comprising a sealing surface of the sealing rim facing into the housing frame and rising at an angle to the plane of the contact mat.

5. The housing according to claim 4 comprising a groove in said contact mat for at least receiving the sealing rim.

6. The housing according to claim 1, comprising a circuit board in the region of the sealing rim for at least stiffening the contact mat.

7. The housing according to claim 1 comprising the contact mat comprising a stiffening carrier.

8. The housing according to claim 1, comprising lugs welded to the housing frame for compressing the contact mat between the sealing rim and the cover part to ensure a water-tight seal.

9. The housing according to claim 1, comprising threaded connectors attaching the cover part to the frame compressing the gasket means therebetween.

10. The housing according to claim 1, comprising snap connectors for coupling the cover part to the frame and compressing a gasket therebetween.

11. The housing according to claim 11, comprising a groove-like depression located in the cover part receiving said gasket means.

12. A housing for a hand-held remote control transmitter including a battery, electronic transmission circuit and a transmission device comprising:
- a housing frame having one or more openings therethrough including at least a first opening for accessing the housing interior and a cutout for receiving a touch keypad;
- a cover part for covering said first opening;
- seal means around the periphery of said first opening and said cover part for sealing said first opening with said cover part;
- a sealing rim on the housing frame surrounding the periphery of said cutout and extending inwardly into the housing frame;
- a keypad elastic contact mat positioned against said sealing rim for covering said cutout;
- means for compressing said contact mat against said sealing rim sealing said cutout, said seal means between said housing frame and cover part comprising a peripheral projecting rim surrounding said first opening and located on either said housing frame or said cover;
- a groove-like perpheral depression on the remaining one of said housing frame and cover for receiving said projecting rim; and
- a continuous gasket positioned in said depression and compressed by said projecting rim.

13. A housing for a hand-held remote control transmitter including a battery, electronic transmission circuit and a transmission device comprising:
- a housing frame having one or more openings therethrough including at least a first opening for accessing the housing interior and a cutout for receiving a touch keypad;
- a cover part for covering said first opening;
- seal means around the periphery of said first opening and said cover part for sealing said first opening with said cover part;
- a sealing rim on the housing frame surrounding the periphery of said circuit and extending inwardly into the housing frame;
- a keypad elastic contact mat positioned against said sealing rim for covering said cutout;
- means for compressing said contact mat against said sealing rim sealing said cutout;
- an additional transmission device opening for exposing an infra-red transmission device;
- an infra-red-transparent cover covering said transmission device opening;
- sealing means for sealing said infra-red-transparent cover to said housing frame over said additional opening;
- a wedge-shaped collar on said housing frame surrounding the periphery of said transmission opening and supported and receiving a disc; and
- weld means surrounding said collar for attaching and sealing said disc to said collar.

14. The housing according to claim 13 wherein said housing frame further comprises:
- a first major outer surface;
- a second opposing major outer surface opposite said first major surface and including said cutout, a first portion of said second opposing major outer surface around said cutout forming a plane oblique to said first major surface and a portion of said second major outer surface being parallel to said first major planar surface.

15. The housing of claim 14 wherein said sealing rim projects into said housing frame around said cutout and includes a substantially planar bottom surface substantially parallel to said oblique plane.

16. The housing according to claim 15 wherein said elastic contact mat has a groove surrounding its periphery for receiving said housing frame sealing rim and wherein said planar bottom surface of the sealing rim forms an oblique angle with an opposing surface of the elastic contact mat at the bottom of the elastic contact mat depression before the mat is compressed.

* * * * *